Patented Nov. 6, 1945

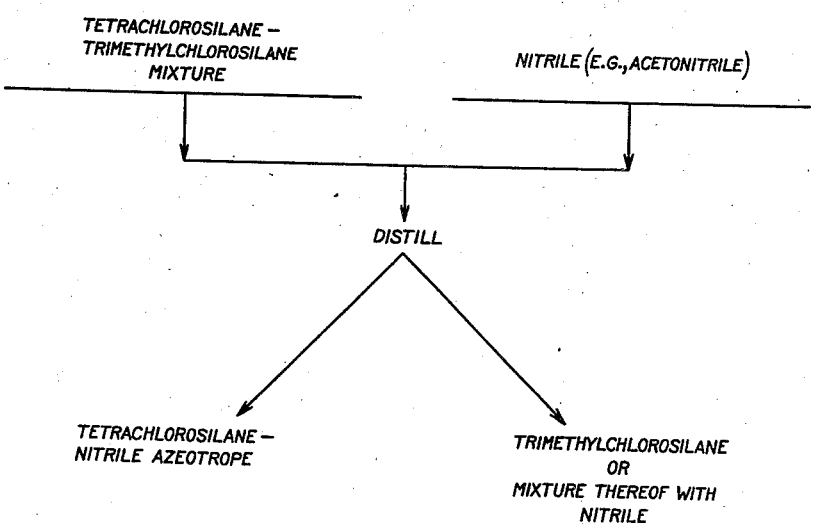

2,388,575

UNITED STATES PATENT OFFICE 2,388,575

RESOLUTION OF MIXTURES OF CHLOROSILANES

Robert O. Sauer and Charles E. Reed, Schenectady, N. Y., assignors to General Electric Company, a corporation of New York Application June 23, 1943, Serial No. 491,942

10 Claims. (Cl. 202—42)

The present invention relates to a method of resolving mixtures of tetrachlorosilane (silicon tetrachloride) and trimethylchlorosilane, particularly azeotropic or constant boiling mixtures of these two chlorosilanes.

Mixtures of the above-mentioned chlorosilanes cannot be completely separated into their various components by fractional distillation because tetrachlorosilane (B. P. 57.6° C./760 mm.) and trimethylchlorosilane (B. P. 57.5° C./760 mm.) not only have approximately the same boiling points, but also form a constant boiling mixture or azeotrope which is made up of the two chlorosilanes in approximately equimolecular proportions and which distills at about 54.5° C./760 mm. The azeotrope contains about 65.8 per cent by weight of chlorine.

Various standard methods are known for resolving an azeotrope. One of the most common methods is to fractionate the azeotrope at pressures other than atmospheric pressure. With this method no appreciable change in the composition of the tetrachlorosilane-trimethylchlorosilane azeotrope is effected at practical super- or sub-atmospheric pressures. A second method involves the solvent extraction of one or more of the components. This method has not been found applicable to the tetrachlorosilane-trimethylchlorosilane azeotrope due to the extreme reactivity of its components and the slight structural and solubility differences between them. A third method involves the chemical conversion of one or more of the components to different derivatives or compounds which can be separated by fractional distillation or solvent extraction. For example, the copending application of Robert O. Sauer, Serial No. 443,024, filed May 14, 1942, and assigned to the same assignee as the present invention, describes and claims a method of resolving the subject azeotropic mixtures which comprises reacting the two chlorosilanes with ethylene oxide to form the corresponding chloroethoxy derivatives and thereafter separating the resultant chloroethoxysilanes by fractional distillation. The separate chloroethoxysilanes may be converted to the original chlorosilanes by treatment with an organic acid chloride such as benzoyl chloride.

In accordance with the process of our invention which is diagrammatically illustrated in the accompanying drawing, the tetrachlorosilane-trimethylchlorosilane mixtures are resolved by fractional distillation thereof in the presence of a nitrile selected from the group consisting of acetonitrile (B. P. 81.6° C./760 mm.) and acrylonitrile (B. P. 79° C./760 mm.). The fractions obtained as a result of the distillation include an azeotrope of tetrachlorosilane and the nitrile and, if sufficient nitrile is present, a second azeotrope of trimethylchlorosilane and the nitrile. With acetonitrile, a tetrachlorosilane-acetonitrile azeotrope containing approximately 9.4 per cent by weight of acetonitrile distills at a temperature of about 49.0° C./760 mm. The trimethylchlorosilane-acetonitrile azeotrope, containing about 7.4 per cent by weight of acetonitrile, distills at about 56° C./760 mm. With acrylonitrile, a tetrachlorosilane-acrylonitrile azeotrope, containing about 11 per cent by weight of acrylonitrile, distills at about 51.2° C./760 mm. The trimethylchlorosilane-acrylonitrile azeotrope, containing about 7 per cent by weight of acrylonitrile, distills at 57° C./760 mm.

Although the nitrile may be added to the chlorosilane azeotrope in any proportions, it is preferably added in approximately the amount calculated as necessary to form an azeotrope with the tetrachlorosilane so that the first fraction will consist essentially of the tetrachlorosilane-nitrile azeotrope and the second principal fraction of substantially pure trimethylchlorosilane. In general, the use of a slight excess of nitrile over that calculated as necessary for the tetrachlorosilane-nitrile azeotrope is desirable to guard against the presence of any substantial amount of an intermediate tetrachlorosilane-trimethylchlorosilane fraction boiling at 54.5° C. This excess nitrile is recovered as a trimethylchlorosilane-nitrile azeotrope, or, if not wholly consumed in the formation of this azeotrope, will remain in the stillpot after the removal of the two chlorosilane-nitrile azeotropes.

We prefer to employ acetonitrile in resolving the tetrachlorosilane-trimethylchlorosilane azeotrope. The use of this nitrile in preference to acrylonitrile offers an additional one degree difference between the boiling point of the tetrachlorosilane-nitrile azeotrope and the pure trimethylchlorosilane or its corresponding nitrile azeotrope. In addition, the condensed tetrachlorosilane-acetonitrile azeotrope collects in the receiver as two separate phases. At 25° C., the upper layer or phase consists of acetonitrile saturated with about 35 per cent by weight of tetrachlorosilane based on the weight of that layer, while the lower layer consists substantially of tetrachlorosilane saturated with about 2.7 per cent by weight of acetonitrile. At 0° C. the upper layer is composed of acetonitrile saturated with about 24 per cent tetrachlorosilane and the lower layer of tetrachlorosilane saturated with about 1.3 per cent acetonitrile. The weight ratio of the upper to lower layers in the distillate at 25° C. is about one part of the upper layer to 9 parts of the lower.

Apparatus particularly adapted for carrying out the separation of the tetrachlorosilane-trimethylchlorosilane azeotrope by the use of acetonitrile comprises a still provided with a 30 to 60 plate fractionating column and a suitable receiver provided with an overflow device so designed that the lighter phase of the tetrachlorosilane-acetonitrile azeotrope overflowing from this receiver can be collected in a separate receiver or returned to the column as reflux. In accordance with our preferred process the stillpot of this distillation apparatus is charged with the azeotrope or any known mixture of trimethylchlorosilane and tetrachlorosilane, and sufficient acetonitrile is added to remove the tetrachlorosilane as its acetonitrile azeotrope. This amount of acetonitrile is roughly one-tenth by weight of the tetrachlorosilane and may be less than one-tenth if the lighter phase of the acetonitrile-tetrachlorosilane azeotrope which collects in the receiver is periodically or continuously returned to the column as reflux. The fractions obtained during distillation of the above described mixture include a tetrachlorosilane-acetonitrile fraction which separates into two phases; an intermediate fraction, the amount and composition of which depends on the efficiency of the column, and a final fraction consisting essentially of pure trimethylchlorosilane. The intermediate fraction may be separately collected and added to subsequent distillation batches. If an excess of nitrile is employed, the trimethylchlorosilane, fraction will distill as the azeotrope with the nitrile.

Pure tetrachlorosilane is obtained from the heavier phase of the silicon tetrachlorosilane-acetonitrile azeotrope by fractionation of this phase to remove the acetonitrile as its azeotrope with tetrachlorosilane. After about 30 per cent of the original charge has been distilled over, the 70 per cent remaining in the stillpot consists essentially of pure tetrachlorosilane.

In many applications of the tetrachlorosilane and trimethylchlorosilane, the nitrile azeotropes of the two compounds may be used in place of the pure compounds with the nitrile functioning merely as an inert diluent. For example, we have found that the nitriles apparently do not interfere with the hydrolysis of either of the chlorosilanes or mixtures thereof with other hydrolyzable halogenosilanes. In such applications, most or all of the nitrile can be separated from the hydrolysis products along with the water and other materials used in carrying out the hydrolysis processes.

It is to be understood that the separation of the chlorosilane azeotrope in accordance with our invention may be accomplished at atmospheric pressure or at pressures above or below atmospheric pressure. Likewise, the invention is not limited to any particular type of distillation apparatus. It is possible to carry out the process continuously in a two-column system. For example, a mixture of tetrachlorosilane and trimethylchlorosilane with a suitable quantity of acetonitrile is fed to the side of one column, the section of the column below the feed serving as a stripping section for the removal of the tetrachlorosilane-nitrile azeotrope from its mixture with trimethylmonochlorosilane. The trimethylchlorosilane is removed in high concentration from the bottom of this column, while the section above the feed serves as an enriching section for further concentration of tetrachlorosilane-nitrile azeotrope, which azeotrope is taken off at the top of the column and condensed. A portion of the condensed tetrachlorosilane-nitrile azeotrope is returned as reflux to this column and the remaining portion allowed to separate into two layers. That layer containing the higher concentration of nitrile is returned to this column as reflux and the remaining layer is fed to the side of a second column wherein it is separated into a tetrachlorosilane fraction of high concentration which is removed at the bottom of the second column and a tetrachlorosilane-nitrile azeotrope which is removed at the top of the column and condensed. A portion of the azeotrope is returned as reflux to the second column and the remainder is mixed with the similar condensate from the first column and allowed to separate into two layers along with that condensate. In such a system, the only nitrile requirement is that represented by losses from the system.

If the distillation apparatus is made of some easily corrodible metal such as iron, we prefer to employ an anhydrous nitrile to guard against corrosion of the apparatus by the hydrogen chloride which is liberated in the still by reaction of any water present in the nitrile with the chlorosilane. Also, when operating in corrodible metal equipment it is desirable to minimize corrosion due to hydrogen chloride dissolved in the chlorosilane mixture by removal of such hydrogen chloride by distillation or other suitable means prior to addition of the nitrile.

What we claim as new and desire to secure by Letters Patent of the United States, is:

1. The process of resolving a mixture of tetrachlorosilane and trimethylchlorosilane which comprises subjecting said mixture to fractional distillation in the presence of a nitrile selected from the group consisting of acetonitrile and acrylonitrile.

2. The process of separating tetrachlorosilane from its azeotrope with trimethylchlorosilane which comprises fractionally distilling said azeotrope in the presence of a small amount of a nitrile selected from the group consisting of acetonitrile and acrylonitrile.

3. The process of resolving a tetrachlorosilane-trimethylchlorosilane mixture which comprises subjecting said mixture to fractional distillation in the presence of a nitrile selected from the group consisting of acetonitrile and acrylonitrile to isolate the trimethylchlorosilane from the lower-boiling products.

4. The process of separating tetrachlorosilane from a mixture thereof with trimethylchlorosilane which comprises fractionally distilling said mixture in the presence of a nitrile selected from the group consisting of acetonitrile and acrylonitrile, the said nitrile being present in an amount sufficient to form a constant boiling mixture with the tetrachlorosilane.

5. The process of resolving a mixture of tetrachlorosilane and trimethylchlorosilane which comprises adding to said mixture a nitrile selected from the group consisting of acetonitrile and acrylonitrile in approximately the amount calculated as necessary to form an azeotrope of tetrachlorosilane and said nitrile, and fractionally distilling the resultant mixture to isolate the tetrachlorosilane-nitrile azeotrope from the higher-boiling components.

6. The process of resolving an azeotrope of tetrachlorosilane and trimethylchlorosilane containing about 65.8 per cent chlorine which comprises subjecting said azeotrope to fractional distillation in the presence of a nitrile selected from the group consisting of acetonitrile and acrylonitrile.

7. The process of resolving an azeotrope of tetrachlorosilane and trimethylchlorosilane which comprises adding acetonitrile to said azeotrope in an amount sufficient to form an azeotrope of silicon tetrachloride and said nitrile, fractionally distilling the resultant mixture to recover the tetrachlorosilane-nitrile azeotrope and returning the lighter phase of the tetrachlorosilane-nitrile azeotrope to the remaining portion of the mixture undergoing distillation.

8. The process of resolving an azeotrope of tetrachlorosilane and trimethylchlorosilane which comprises adding acetonitrile to said azeotrope, fractionally distilling the resultant liquid mixture, recovering the low boiling tetrachlorosilane-nitrile azeotrope in the form of two phases respectively richer and poorer in silicon tetrachloride and returning the phase poorer in silicon tetrachloride to the liquid undergoing fractionation.

9. The process of resolving a constant-boiling mixture of tetrachlorosilane and trimethylchlorosilane which comprises adding acetonitrile to said mixture in an amount corresponding to about one-tenth of the weight of the tetrachlorosilane and fractionally distilling the resultant mixture to separate the silicon tetrachloride-nitrile azeotrope from the higher-boiling component.

10. The process of separating tetrachlorosilane from an azeotrope of tetrachlorosilane and trimethylchlorosilane which comprises adding acetonitrile to said azeotrope in approximately the amount calculated as necessary to form an azeotrope of tetrachlorosilane and acetonitrile fractionally distilling the resultant mixture, recovering the lower-boiling tetrachlorosilane-acetonitrile azeotrope in the form of two phases respectively richer and poorer in tetrachlorosilane, returning the phase poorer in tetrachlorosilane to the liquid undergoing fractionation, and subjecting the remaining phase to fractional distillation to isolate substantially pure tetrachlorosilane.

ROBERT O. SAUER.
CHARLES E. REED.